July 17, 1956  J. H. STRANDELL ET AL  2,754,923
SINGLE CRANK CONTROLLABLE PITCH PROPELLER
Filed June 30, 1952  8 Sheets-Sheet 1

FIG. I.

INVENTORS
JOHN H. STRANDELL
STERLING A. FIELDING

BY George Sipkin
B. L. Zangwill
ATTORNEYS

INVENTORS
JOHN H. STRANDELL
STERLING A. FIELDING

BY George Sipkin
B. L. Zougarll

ATTORNEYS

INVENTORS
JOHN H. STRANDELL
STERLING A. FIELDING
ATTORNEYS

United States Patent Office 2,754,923
Patented July 17, 1956

2,754,923

SINGLE CRANK CONTROLLABLE PITCH PROPELLER

John H. Strandell, Springfield, and Sterling A. Fielding, Portsmouth, Va.

Application June 30, 1952, Serial No. 296,514

6 Claims. (Cl. 170—160.32)

(Granted under Title 35, U. S. Code (1952), sec. 266)

The invention described herein may be manufactured and used by or for the Government of the United States of America for governmental purposes without the payment of any royalties thereon or therefor.

The present invention relates to an improvement in controllable pitch propellers, such as used on ships, provided with means to control the pitch of the blades with the propeller shaft rotating at constant rated speed or at reduced speed, so as to effect propulsive thrust forces from maximum ahead to maximum astern in accordance with maneuvering requirements. The means for changing the pitch of the blades comprises a servomotor, located in an after compartment of the ship, which receives its power from an oil injector and control unit located adjacent to the servo motor. The prior art discloses variable pitch propellers but the design of the latter is such that they are subject to many inherent deficiencies. As a result, the advances made in this field have been restricted, principally because of the difficulties involved in designing a practical and efficient type of controllable pitch propeller and because of the tremendous expense connected with the designing and testing of such propellers after they have been constructed and installed in ships. The instant invention is the result of several years of research and experimentation, both in laboratories and on ships, and the design of the controllable pitch propeller disclosed herein is believed to eliminate the undesirable features formerly found in prior art propellers of this type.

It is therefore an object of the invention to provide an improved controllable pitch propeller for use on marine vessels.

A further object of the invention is the use of flexible wires for changing the angular pitch of each blade.

Another object of the invention is the provision of means for changing the pitch of all blades simultaneously.

Another object is the use of an oil injector and control valve mechanism for providing the servo-motor with the necessary power for changing the pitch of the blades.

A still further object is the provision of a servo-motor mechanism for transferring the force supplied by the oil injector to a push-pull rod connected to the blades for varying the pitch thereof.

Other objects and many of the attendant advantages of this invention will be readily appreciated as the same becomes better understood by reference to the following detailed description, when considered in connection with the accompanying drawings, in which like reference numerals designate like parts throughout the figures thereof and wherein.

Figure 1:
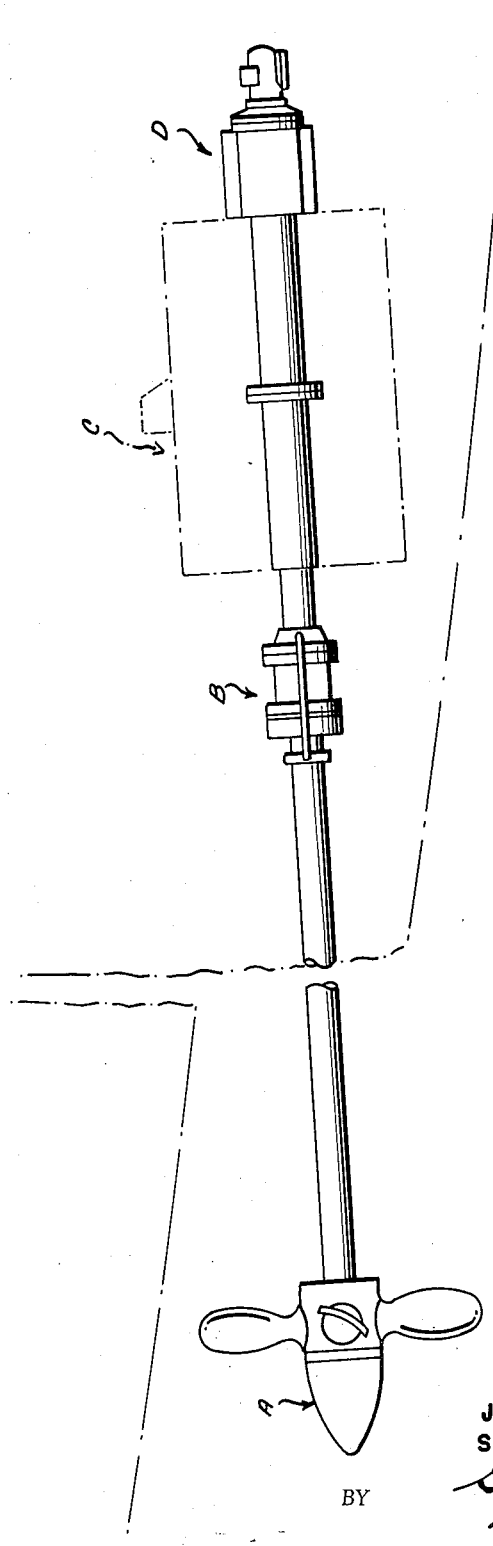
Figure 1 is a diagrammatic showing of the controllable pitch propeller, servo-motor and control unit therefor as applied to a ship.

Referring now to the drawings wherein like reference characters designate like or corresponding parts throughout the several views, there is shown in Figure 1 a propeller hub indicated at A, a servo-motor at B, an electric propulsion motor at C and an oil injector and control valve unit at D. These four major parts are shown in their relative association in a ship, the outline thereof being shown by dotted lines in Figure 1.

Figure 2:
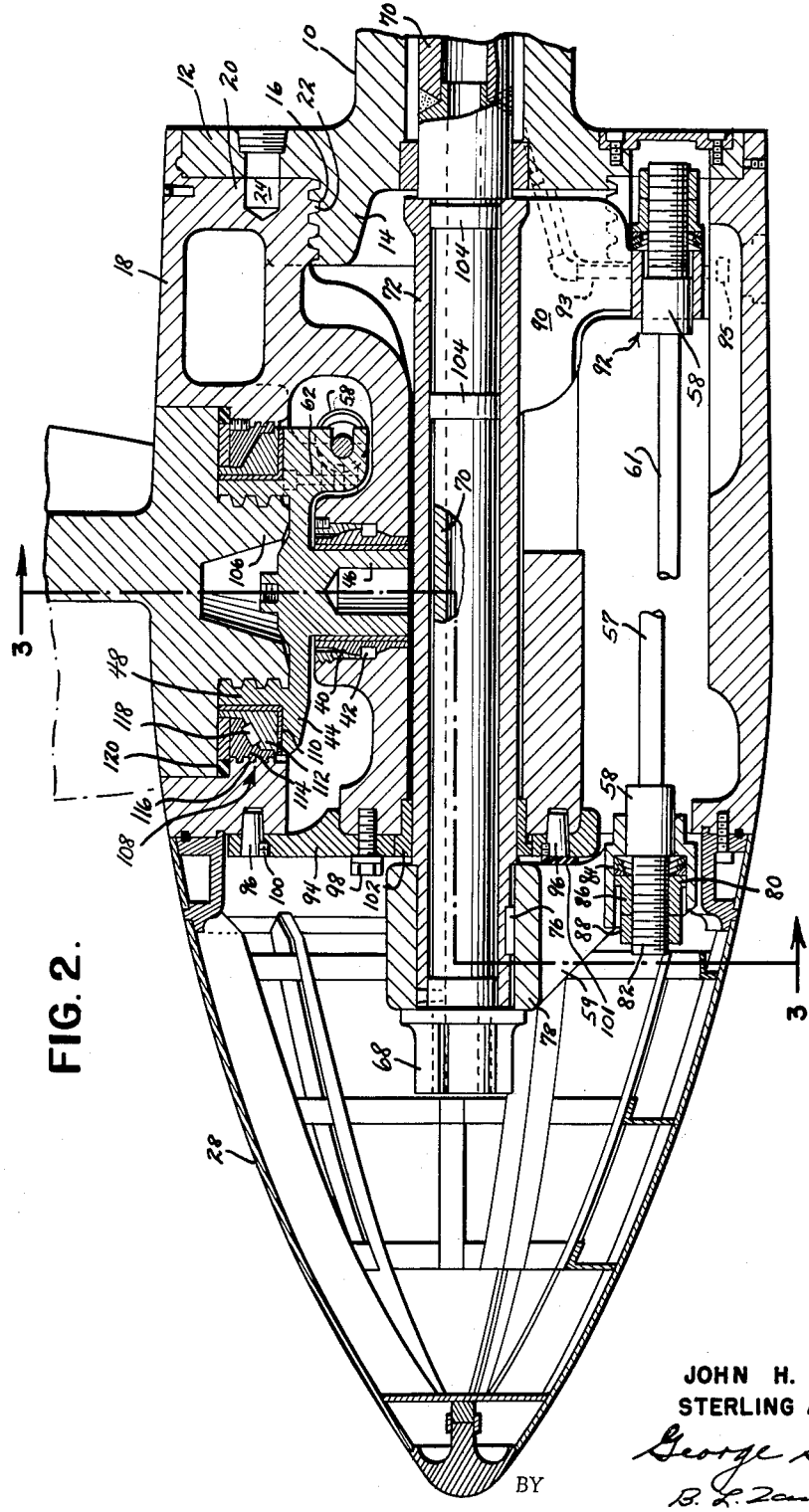
Figure 2 is a longitudinal sectional view of the propeller hub taken on lines 2—2 of Figure 3.
Figure 3:
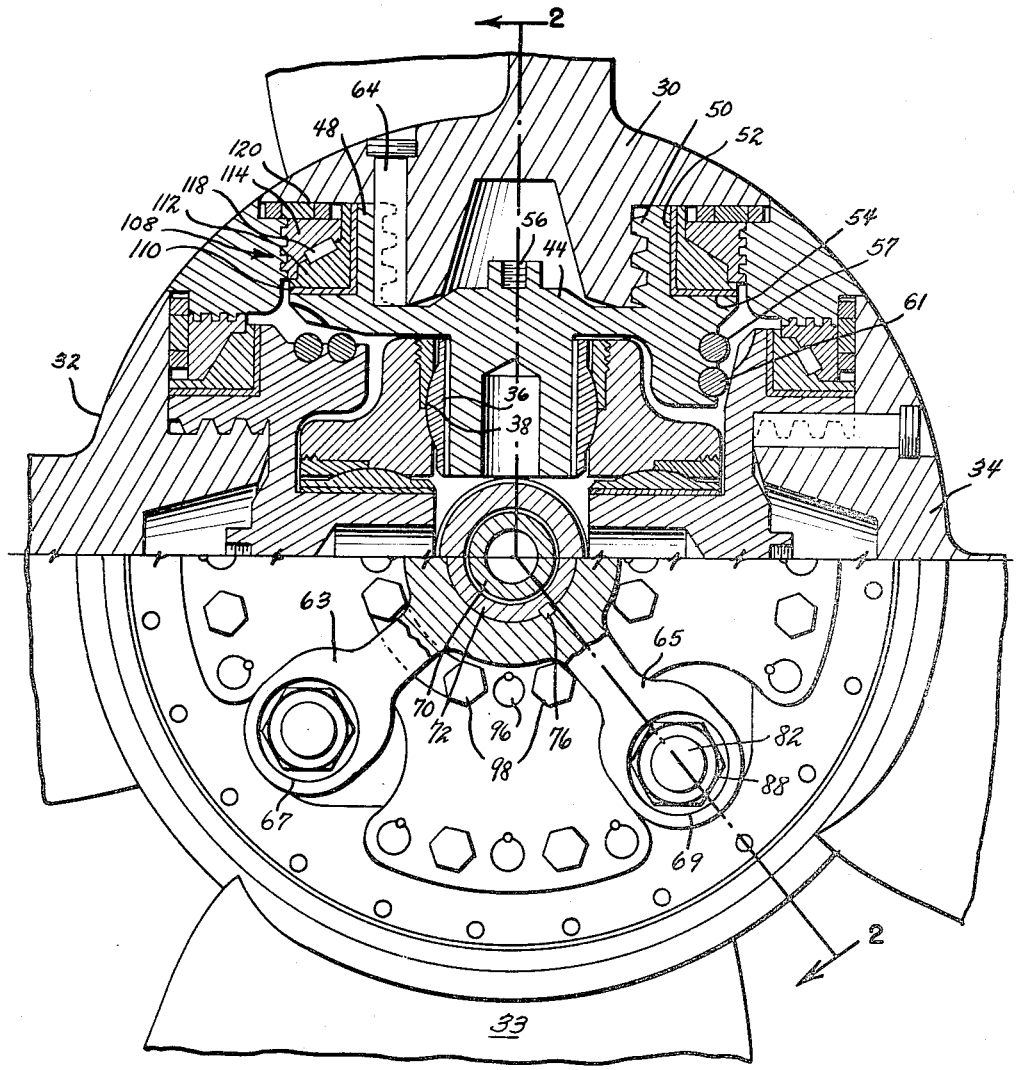
Figure 3 is a vertical sectional view of the propeller hub taken on lines 3—3 of Figure 2.
Figure 4:
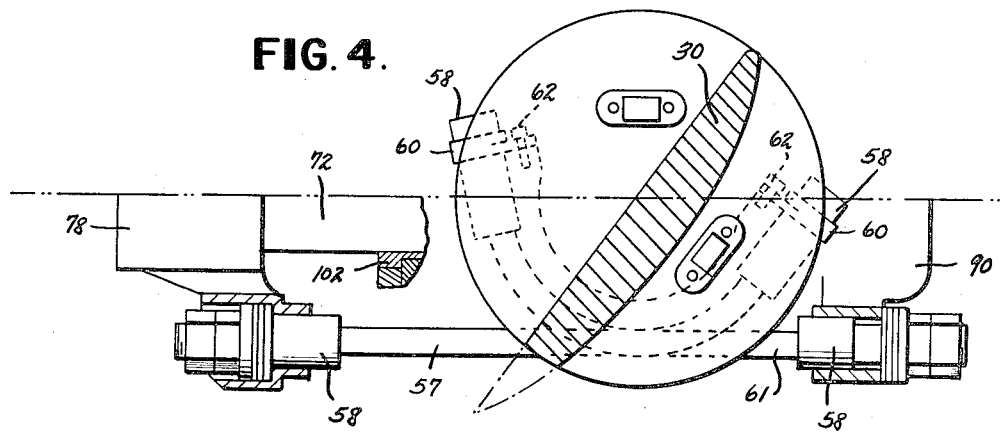
Figure 4 is a diagrammatic plan view of a propeller blade showing the cable connections at one end to the cable drums and at the other end to the push-pull rod spiders.

The propeller hub A is more specifically shown in Figures 2, 3, and 4 and reference to these figures shows a propeller shaft 10 flaring outwardly at 12 and having a rearwardly extending portion 14 which is outwardly threaded at 16 to receive hub 18.

The hub 18 comprises the main structural supporting element for the propeller blades. This propeller hub has four large circular openings extending around its periphery and these openings are large enough to accommodate the propeller blades and the parts supporting same in the hub structure.

The hub is provided with a forwardly extended flange 20 which is interiorly threaded at 22, the threads being adapted to mate with threads 16 on the after section of the propeller shaft 10. The hub casting 18 is threaded on the rearward end of propeller shaft 10 and is securely positioned in place by means of dowels 24 which locate the position of the propeller hub with respect to propeller shaft. Secured to the after end of hub casting 18 is a dunce cap 28 which serves to give the hub a streamlined effect and also provides a working area for the parts used or employed to rotate the propeller blades. The outer parts of the hub A are provided with packing means for preventing the entry of sea water into the propeller hub and also for preventing the escape of oil from the hub to sea. The hub A is adapted to be filled with oil which is kept at a pressure higher than that prevailing at the hub from the surface of the water.

The means for supporting each of the propeller blades 30, 32, 33, and 34 comprises identical structure and description of only one such supporting means will hereinafter be given. The blade supporting means comprises a trunnion bearing shell 36 which is hollow in shape and in the form of a cylinder having an outwardly built-up portion 38. This trunnion bearing shell is positioned within a hollow opening in hub casting 18 and is held in place by the cooperative action of a bushing 40 of like cylindrical design and a key 42. The trunnion bearing shell is lined with a bearing material so as to provide for the smooth turning operation of a cable drum 44 which has a portion 46 extending into and snugly fitted to the bearing shell 36. This cable drum has a built-up portion 48 forming an interior cylindrical opening and which is interiorly threaded at 50. The outer side of this cylindrical wall, which is perpendicular to the main portion of the drum, is provided on its outer side with a smooth vertical wall 52 and a horizontal seat 54. Centrally positioned within the cylindrical opening made by wall 48 is a threaded portion 56 adapted to receive a drum removing tool for facilitating the removal of the cable drum from the trunnion bearing shell. Below the horizontal seat and positioned approximately 180° apart are two openings for receiving cable securing shells 58, Figs. 2 and 4, which fit into the openings provided in the outer opposite sides of the cable drum. The other ends of the cables 57 and 61 are respectively secured to guides extending outwardly from the push-pull rod housing tube 72. These cables are utilized to impart a turning movement to the cable drum, one cable serving to turn the drum in one direction to achieve a forward pitch on the propeller blades while the other cable is used for imparting a like force to the cable drum for achieving a reverse pitch on the propeller blades. Each of the cable securing shells is held in fixed position to the cable drum by means of a bracket 60 which wraps around each of the shells and is secured to the cable drum by means of a key 62.

Each of the propeller blades 30, 32, 33 and 34 is screwed into the cable drum and locked thereto by means of a key which fits into slot 64, the slot being such that it is formed partly by the lower end of the propeller blades and the cylindrical wall 48 formed in the cable drum. As aforementioned, the hub 18 is hollow and positioned therein is the after end of a push-pull rod 70 which is connected to a cable spider 59 and terminates at its forward end in a piston located in servo-motor B. In order for the push-pull rod 70 to be accurately aligned within the hub A, hollow cylindrical tube 72 is fitted between the inner walls of the hub and around the push-pull rod 70. This cylindrical tube 72 has a guide 78 secured to its after end by means of a key 76 to prevent circular movement of the guide on the rod, and in order to prevent the guide from sliding off the rod, a nut 68 is threaded on the rod 70, thus holding the guide in a secure position. The guide 78 is provided with four laterally extending arms, two of which are shown at 63 and 65 in Figure 3, with openings 67 and 69 in the end thereof for receiving the cable shells 58 and its securing means 80.

The cable securing means comprises the following: The shell 58 has incorporated in its after end a threaded stud 82 which is positioned within the opening provided within each of said arms, and has positioned therearound a spring 84 held in place by nut 86, the latter being locked into position by lock nut 88. The forward end of tube 72 is likewise provided with a guide 90, identical to guide 78, having four outwardly extended arms thereon with circular openings in their outer ends for receiving the cable securing means 92, which is identical to the above-described securing means 80. It is now evident that tube 72 is positioned within the hollow central opening provided in hub 18 and encloses push-pull rod 70, the latter being spaced therefrom by flanges 104 on rod 70.

Attached to opposite ends of tube 72 are aforementioned guides 78 and 90, each having four outwardly extending arms for respectively securing thereto one end of each of eight cables. In other words, there are two guides having a total of eight arms, eight cables and four cable drums, with each of the cable drums having two cable receiving openings. Each of the eight cables is therefore secured at one end to its respective guide arm and at its other end to an opening in a cable drum. Movement of the push-pull rod to the left, as shown in Figure 2, tensions the cables connected to guide arm 78 and each cable drum and propeller blade is consequently moved in a clockwise or reverse pitch direction. When the push-pull rod is moved to the right, the cables connected to arms of guide 90 are tensioned and the cable drums and blades are moved in a counterclockwise or forward pitch direction.

The means for strengthening and holding the various parts in alignment comprises a plate 94 which is fitted in such a manner as to surround the tube 72 and is held in rigid relationship with said parts by means of dowels 96 and bolts 98 which secure the plate to hub casting 18. The dowels comprise tapered pins which are held in place by means of set screws 100. Secured to the plate 94 is an elastic pitch limit block 101 which serves to limit the travel of the guide and therefore serves as a block or stop. The tube 72 is further held in position by means of a spider bushing 102 and the after end of push-pull rod 70 as aforementioned, has bearing surfaces 104 positioned therearound for also positioning this rod with respect to tube 72.

It is apparent that the neck 106 of each of the blades turns with the cable drum as a unit in the hub casting and the assembly shown at 108 facilitates the movement of this unit in the hub casting. This assembly comprises a thrust bearing liner 110 positioned on the step formed by the vertical wall 48 and horizontal seat 54 of the cable drum. Lying on the horizontal seat is a thrust bearing shell 112 which is adapted to coact with a thrust ring 114 which is screwed into the hub at 116. Each of the thrust bearing shell 112 and thrust ring 114 is appropriately grooved to receive a key 118 which holds these two parts in rigid relationship with one another. Positioned on top of ring 114 is a circular ring and sealing member 120 for preventing the escape of oil from the hub.

The oil injector and control valve mechanism B, shown in Figures 6, 7, 8 and 9, comprises a unit secured to the forward end of a main thrust bearing which comprises a part of motor C. The forward end plate 122 of said thrust bearing has secured thereto, by means of bolts 124, housing 126 containing the control valve and means for remotely indicating the pitch of the blades at any one instant. There are three concentric, oil carrying tubes, respectively indicated at 128, 130, and 132 within the line shaft extending forwardly from the servo-motor to and through the forward plate 122 of the thrust bearing housing.

The outer tube 128 terminates near the end of the central hollow opening formed by plate 122 and is held in spaced relation to tube 130 by means of a seal ring 134. Positioned around outer tube 128 is the usual packing means 136 generally used in this type installation for preventing the escape of oil from the thrust bearing into the areas formed by housing 126 with said thrust bearing. A plate 138 and bushing 140 retains the packing means in position and also provides for tightening the packing when it becomes leaky because of wear.

The intermediate tube 130 opens in chamber 142 and outlet 144 carries the oil therefrom back to the source of hydraulic supply. Outlet passage 146 serves as a drain for removing the oil which leaks past seal 136, such oil flowing out through outlet 146 to the bilges in the ship.

The inner tube 132 extends through the after wall 150 of housing 126 into chamber 152, said tube 132 being surrounded by packing 154 which is held in place by plate 156. Pressure gage connections are shown at 158 for providing means for indicating oil pressure existing in chambers 142 and 152.

The inner tube 132 is directly connected at its after end to a servo-motor piston (Figure 5) and at its forward end to a forked lever 160. The means for securing the forked lever to the forward end of the tube comprises a guide nut 162 which is threaded on the end of said tube and a bushing 164 is placed over said guide nut and held in place by nut 165, the bushing serving to position a sliding tube guide arm 166 which is adapted to slidably fit in guide 168 secured to housing 126 by means of support 170.

Figure 7:
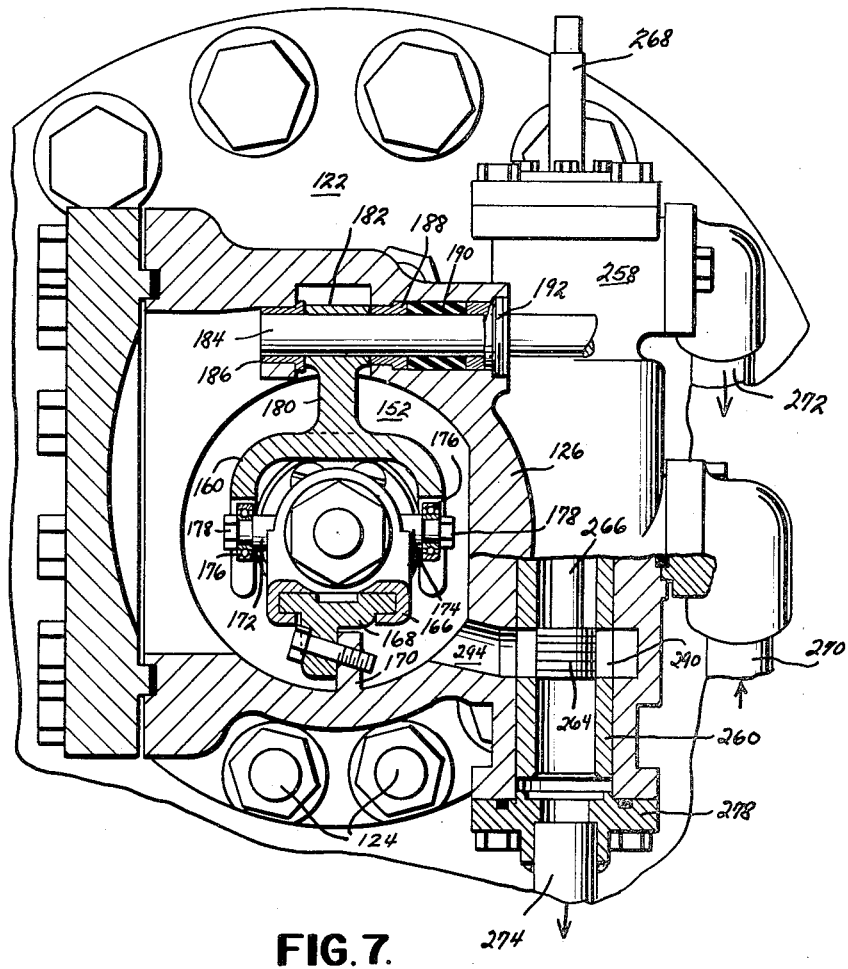
Figure 7 is a sectional view of the oil injector and control valve taken on lines 7—7 of Figure 6.

Guide arm 166 has two short shafts 172 and 174, Figure 7, respectively extending outwardly from guide arm 166 and each of these shafts are respectively adapted to lie within circular openings provided in each of the forked lever arms. A ball bearing unit 176 comprising balls and a pair of races are fitted between each of the shafts and the forked lever arm openings so as to provide for smooth rotary movement of the forked lever, and these ball bearing units are appropriately held in place by means of nuts 178 threaded on the outer end of each of the shafts.

The upper end 180 of said forked lever terminates in a hollow, circular, bearing member 182 which is rigidly fixed to shaft 184 extending horizontally therethrough. Shaft 184 is supported by two bushings 186 and 188 respectively fitted into openings formed in housing 126 on either side of member 180. Since chamber 152 is adapted to be filled with oil, it is necessary to provide a packing around shaft 184 to prevent the escape of oil from chamber 152. This packing is shown at 190 and held in place by a bushing and plug 192.

There are two follow-up crank arms 194 and 196 (Fig. 8) connected to the exterior end of shaft 184, as by means of splines or keys, and these arms turn with said shaft and are respectively connected to a propeller blade pitch indicating device (not shown) and to means for moving a hydraulic control valve 258. Arm 194 has connected to its other end a bar 198 which is pivotally connected to arm 194 at 200 and leads to the above-mentioned pitch indicating device. Arm 196 is likewise pivotally connected at 202 to a connecting rod 204 having a connecting rod adapter 206 at its upper end which supports a cross arm 208 through means of a movable joint 210.

Mounted on the top of thrust bearing housing 122 is a structure generally indicated at 212 (Fig. 8) for movably supporting cross arm 208 which acts at its mid-point 214 to move ball joint rod 216 vertically. The structure 212 comprises a guide rod 215 secured at its upper end to rigidly mounted plate 218 and at its lower end to a bracket 220. Positioned adjacent rod 215 is a movable cup-shaped member 222 adapted to have secured therein, as by means of bolts, two rollers 224 which engage guide rod 216 for sliding movement therealong.

Figures 8, 9:
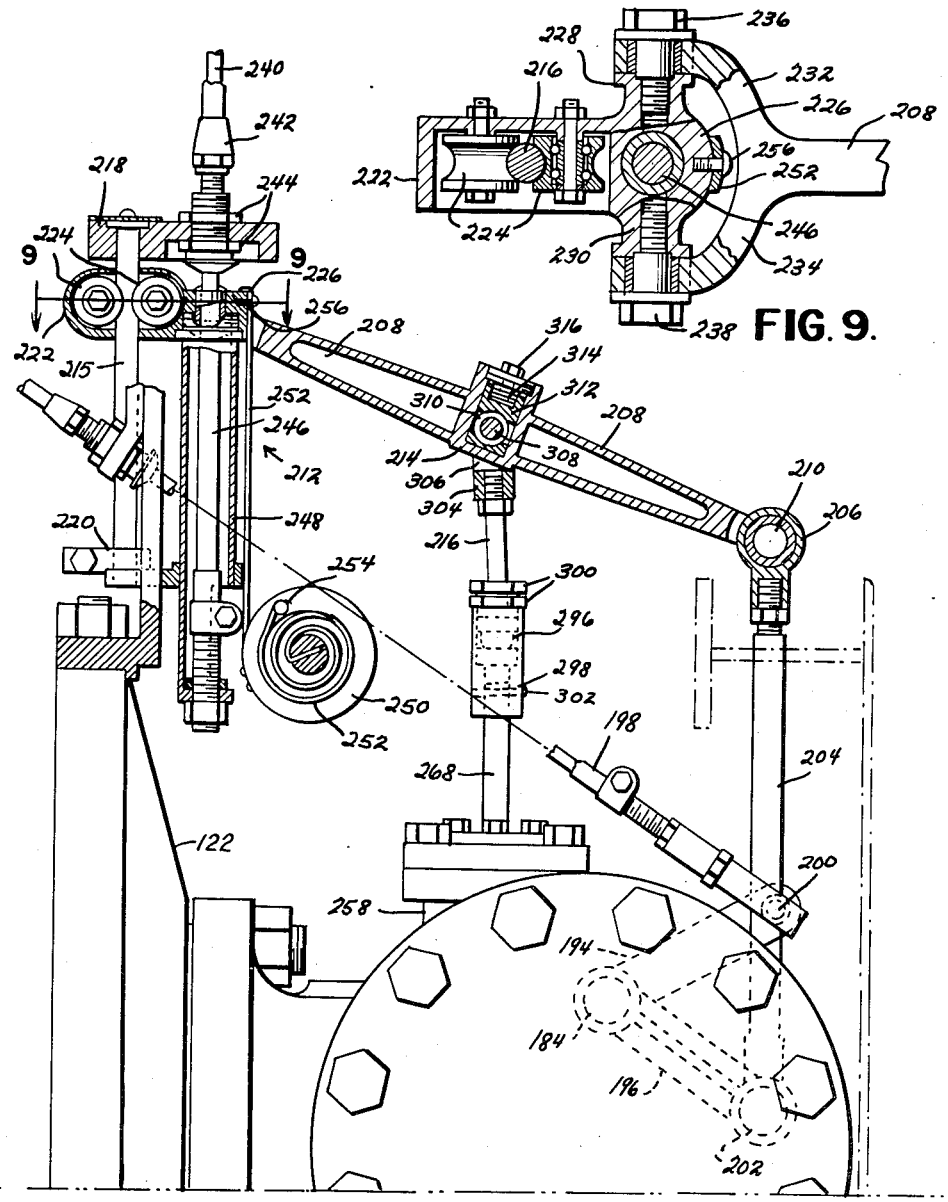
Figure 8 is a cross-sectional view of the control valve actuating means.
Figure 9 is a cross-sectional view of a lever arm taken on lines 9—9 of Fig. 8.

Integrally formed with said member 222 is a laterally extending portion 226 having extensions 228 and 230, Figure 9, protruding therefrom. Arm 208 divides at its outer end into a Y, forming arms 232 and 234 which are secured to said extension by bolts 236 and 238 respectively, so that vertical movement of member 222 imparts a corresponding motion to arm 208 which acts about its midpoint 214, to exert a force on ball joint rod 216 moving same according to vertical movements of member 222. The means for making possible vertical movement of member 222 comprises a teleflex cable 240 operated from a remote point, extending through adapter 242, which is mounted on plate 218 and locked in place by nuts 244, and terminating in a fixed connection to bar 246. The latter is secured at its bottom end to sleeve 248 which also serves to house said bar 246. Positioned adjacent sleeve 248 is a spring housing for enclosing spring 252 which serves to create a tensioning force acting in a downward direction on member 222. The spring is secured to said spring housing by a spring locking pin 254 and at its other end to member 222 at 256.

Figure 10:
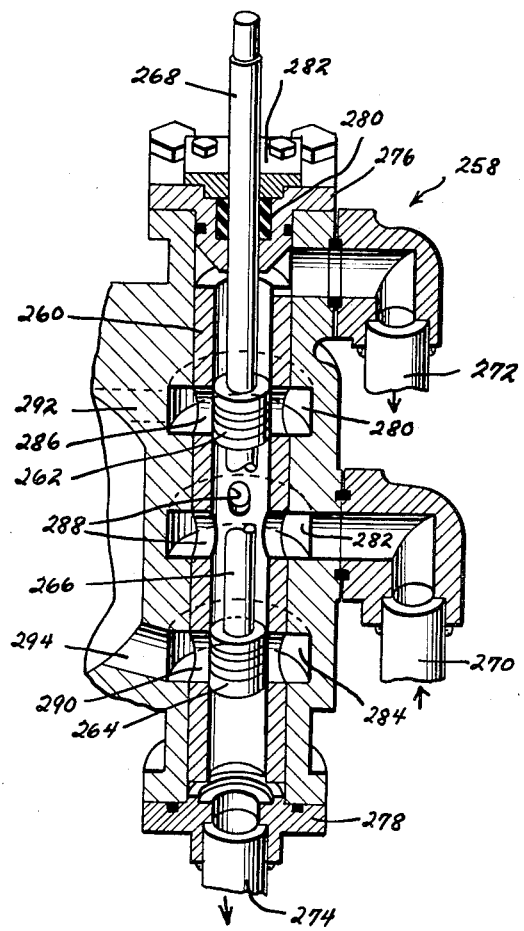
Figure 10 is a detailed cross-sectional view of the control valve shown in full in Figures 7 and 8.

A control valve 258 is formed as an integral part of housing 126, Figures 7 and 10, and serves the purpose of supplying high pressure oil to servo-motor B and returning same to the source of hydraulic supply. The supply of such oil is furnished either from the ship's main hydraulic system or from an independent source, depending on the type of ship in which the structure exemplified herein may be installed.

The control valve 258, Figure 10, comprises a slide valve liner 260 secured in a cylindrical opening provided in housing 126. A slide valve comprising two pistons 262 and 264 respectively interconnected by a shaft 266 are moved through a valve stem 268 connected to arm 208 which serves as the actuating force for moving said pistons. There is one oil supply inlet 270 and two oil return outlets 272 and 274 attached to the control valve housing for supply and returning oil to the system. Both the upper and lower ends of the control valve housing are provided with centrally apertured plugs 276 and 278 having O-type packing rings around their periphery to prevent the escape of oil from the housing. The valve stem 268 extends through the central aperture of top plug 276 and the latter is additionally provided with packing 280 which fits around the valve stem where it passes through the plug. Plate 282 is bolted to plug 276 and serves to hold the packing in position. The lower plug 278 receives one of the oil outlet return pipes which serves to conduct the oil back to the aforementioned hydraulic source of supply. The control valve housing is provided with three grooves 280, 282, and 284 which communicate with mating ports 286, 288 and 290 drilled in the body of liner 260. Passageways 292 and 294 respectively serve as supply and return means according to whether an ahead or reverse pitch is applied to the propeller blades.

As mentioned above, the valve stem 216 is responsive to movements of valve actuating lever 208, such movements being made possible through the ball joint rod 216 connecting said lever with valve stem 268. Ball joint rod 216 terminates at its lower end in a ball 296 which is loosely held in a valve stem connector 298 by ball securing nuts 300 and the valve stem 268 is secured to valve connector 298 by a taper pin 302. The upper end of rod 216 is threaded into the lower end 304 of a forked bracket 306, which is identical in structure to forks 232 and 234 shown in Figure 9, and the forks straddle and are secured to lever 208 by a swivel pin 308. This swivel pin extends through a swivel ball 310 which is held in place by an adjusting ball seat 312, adjusting spring 314 and plug 316.

The control valve operates in the following manner. High pressure oil is supplied through pipe 270 and fills the space or area defined by pistons 262, 264 and the walls of liner 260, this oil being trapped therein since the pistons cover ports 286 and 290. When a change in pitch of the blades is desired, valve stem 268 is moved in a downward direction, for example, and the pistons uncover ports 286 and 290 thus allowing the oil to flow from the source of supply through port 290 and passageway 294 to the servo-motor piston. The oil displaced by movement of said servo-motor piston is returned through passageway 292, port 286 and outlet 272 to return to the source of supply. To achieve a change in pitch in the opposite direction, the valve stem 268 is moved upwardly and passageway 292 then serves to supply oil to the servo-motor piston and passageway 294 and outlet 274 serves as a return.

Figure 5:
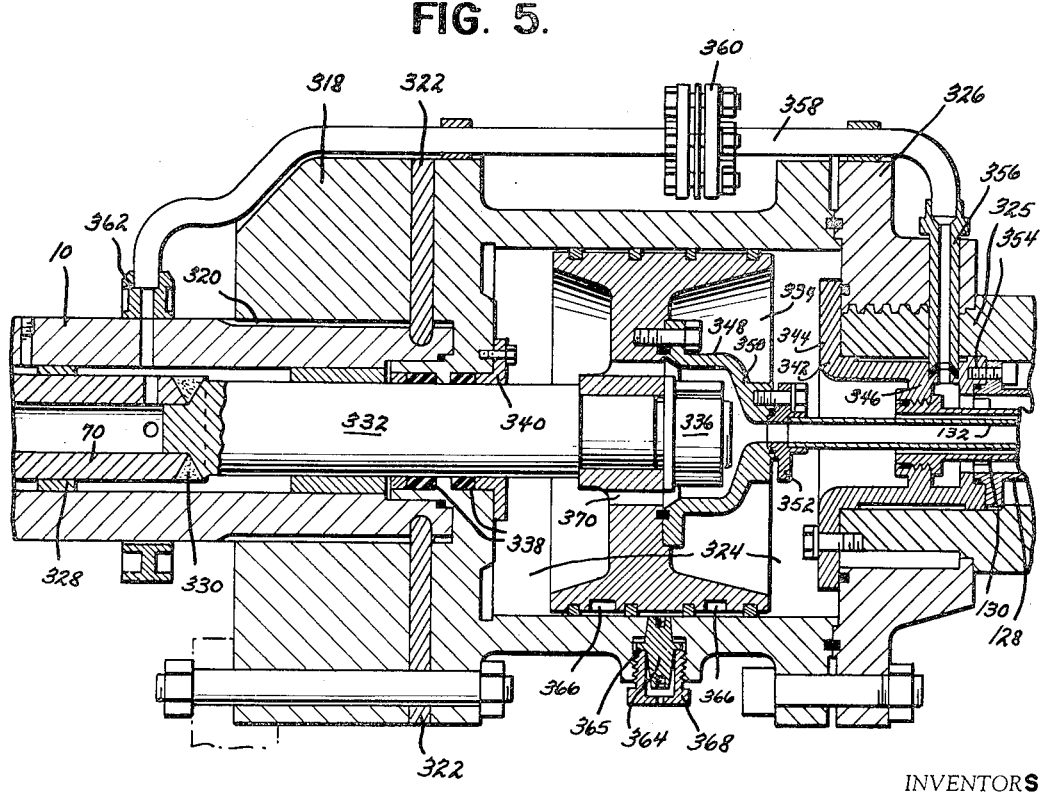
Figure 5 is a longitudinal sectional view of the servo-motor used for imparting movement to the push-pull rod.
Figure 6:
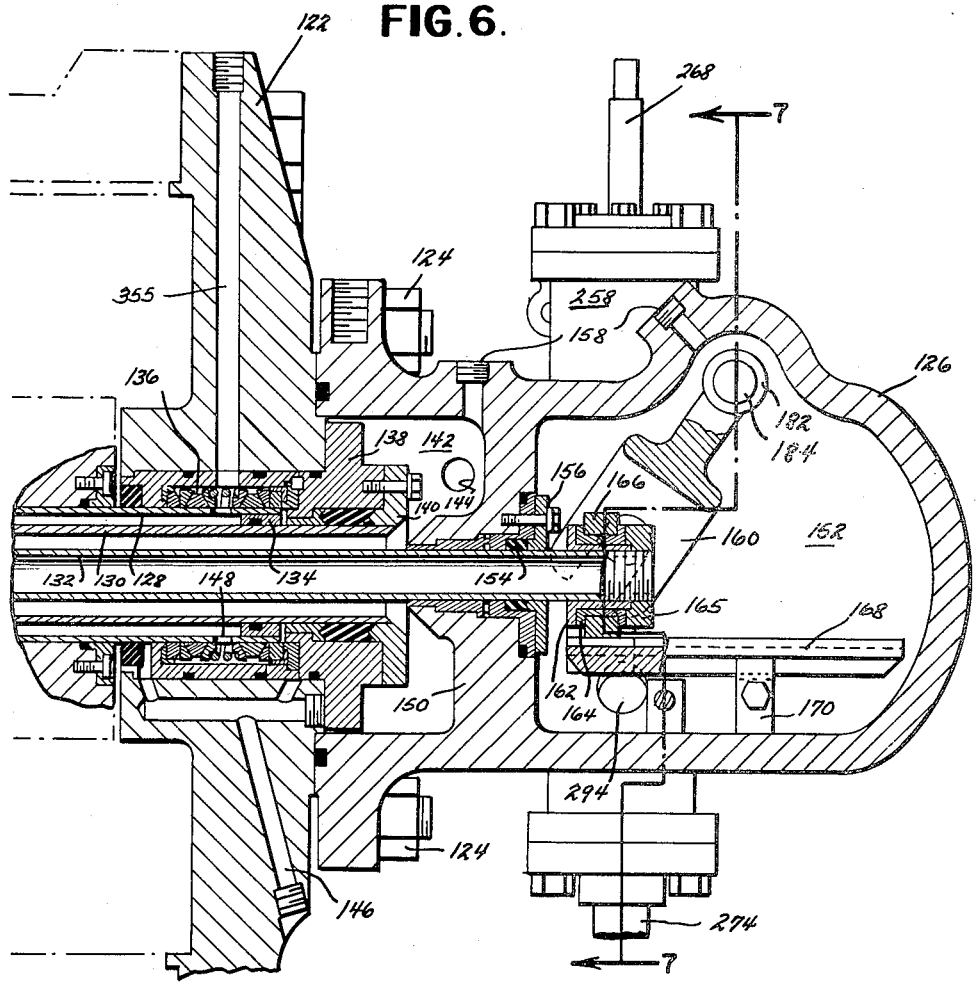
Figure 6 is a longitudinal sectional view of the oil injector and control valve designed for transferring hydraulic power to the servo-motor for changing the pitch of the propeller blades.

The servo-motor mechanism shown in Figure 5 is utilized for the purpose of transmitting hydraulic power to the servo-motor piston which conveys such force to the propeller blades for changing the pitch thereof. Propeller shaft 10 extends forwardly from the hub A to the servo-motor B and is connected thereto by means of a coupling sleeve 318, said coupling sleeve being secured to said shaft by means of splines 320 and a pair of half-moon shaped keys 322. The coupling sleeve extends forwardly to form a servo-motor cylinder 324 which is connected to a line or propulsion shaft 325 by means of an internally threaded plate 326. The push-pull rod 70 is spaced from propeller shaft 10 by means of spacing members 328 and the rod is welded at 330 to a push-pull rod shaft extension 332, which is secured to the servo-motor piston 334 by means of nut 336. In order to prevent the escape of oil from servo-motor cylinder 324 to the area defined by propeller shaft 10 and push-pull rod 70, packing means are provided at 338, which is secured in place by means of a plate 340 bolted to coupling sleeve 318. A tube connector 342 having a flange 344 which is adapted to lie against the after end of the propulsion motor shaft and extends forwardly with said shaft and terminates in a wall 346 which is internally threaded.

A second tube connector 348 is bolted to the forward side of the servo-motor piston which also terminates in a wall 350 having a small cylindrical opening to which is bolted a plate 352 having a like opening adapted to mate with the opening of the second tube connector 348. Inner tube 132, which extends between the servo-motor piston and the forked lever 160 in housing 126, is connected to the opening provided in plate 352 by any securing means, such as welding, for example. Intermediate tube 130 which terminates at its forward end in plate 140 is secured by means of threads at its after end to the threaded opening provided in tube connector 342. Outer tube 128 which also extends forwardly to housing 126 is secured, as by bolting or welding, at its after end to the forward end 354 of tube connector 342.

In order to provide hub A with oil, thrust bearing plate 122 is bored at 355 and threaded at 357 to provide for a tube fitting leading to an oil supply tank which is automatically maintained under a pressure approximately 3 to 5 p. s. i. greater than the sea pressure prevailing at the hub A. The oil then flows between the outer and intermediate tubes 128 and 130, respectively, and is conducted to the servo-motor and then by-passed around this mechanism and taps into the propeller shaft for further delivery to the hub. The by-pass comprises a hollow cylindrical fitting 356 which is inserted through plate 326, propulsion motor shaft, tube connector 342 and terminates in the area defined by the outer tube 128 and intermediate tube 130. Connected to the top end of hub connector 356 is a pipe 358 which extends rearwardly through coupling 360 and taps into propeller shaft 10 by means of fitting 362, thus providing a by-pass assembly which conveniently transfers the hub lubricating oil from the propulsion motor shaft to the propeller shaft. The oil, or salt water, in the event of leakage, may be pumped out of the hub through pipe 93 and strainer 95, shown by dotted lines in Figure 2.

In this type of ship propulsion, it is desirable that some means should be provided for maintaining the pitch of the propeller blades in a fixed forward or reverse pitch position in the event of a casualty to the blade moving means. This means is provided in the form of a plug 364 having a short end and a long end, and it is positioned in internally threaded opening 365 provided in a wall of coupling sleeve 318 and the plug is held in this opening by means of a threaded plug 368. The long end of plug 364 is adapted to extend into opening 366 provided in the outer walls of the servo-motor piston. In normal operation the short end of the plug is positioned in the coupling sleeve as shown in Figure 5. When a casualty does occur, the blades are jacked in either a forward or reverse pitch position until one of openings 366 is in alignment with the opening provided in the coupling sleeve and when such openings do align with one another, the long end of the plug is made to engage any one of openings 366. Plug 368 is then fitted over plug 364 thus holding said plug in a secure position.

The operation is as follows: When it is desired to achieve a change in pitch of the propeller blades, the teleflex cable 240 is moved, moving member 222 in a downward position from that shown in Figure 8 of the drawings. This downward movement carries lever 208 downwardly which acts through ball rod 216 and valve stem thus moving pistons 262 and 264 to uncover ports 286 and 290. This allows oil to flow from the source of hydraulic supply through inlet 270, port 290, passageway 294, chamber 152, into inner tube 132, through passageway 370, and the servo-motor piston and finally into the servo-motor cylinder 324. Oil pressure in said cylinder acts against the after side of the servo-motor piston to move said piston in a forward direction and the oil displaced by said piston movement flows between tube 132 and 130 to chamber 142 adjacent to the thrust bearing housing, through passageway 292, ports 286, to the outlet 272 which returns the oil to the source of hydraulic supply.

Since the push-pull rod 70 is directly connected to the after end of the servo-motor, it will move in a forward direction carrying with it guide arms 59 and 90. The cable drum 44 being connected to said guide arms through cables will move the cable drum and each of the propeller blades an amount in accordance with the linear change in the push-pull rod. The servo-motor piston, push-pull rod 70, guide arms 59 and 90, the cables, cable drum 44 and propeller blades will continue moving until the control valve shown in Figure 9, moves to cut off the supply of hydraulic power to the said servo-motor piston.

This hydraulic supply is cut off in the following manner: As the servo-motor piston moves forwardly, forked arms 160 will move because of its connection to the servo-motor piston through tube 132. This movement is such that shaft 184 turns with said forked arms, carrying with it connecting rods 194 and 196. Movement of connecting rod 194 acts through rod 198 to remotely indicate the pitch of the propeller blades at any instant. Connecting rod 196, which also is turned by shaft 184, acts through rod 204 to raise lever 208, which in turn, because of its direct connection with ball rod 216 and valve stem 268, will raise pistons 262 and 264 to an upward position thus closing off the supply oil through ports 190 and the return of oil through ports 286. Since the supply of high pressure hydraulic oil is cut off, no further movement of the servo-motor piston will occur and the propeller blades will therefore be prevented from achieving a further new position.

When it is desired to change the position of the blades to a new position, for example, to a reverse pitch, the teleflex cable is moved to a raised position thus carrying lever 208 with it. Ball rod 216 pulls valve stem 268 upwardly uncovering ports 286 and 290. Instead of the oil supply flowing through outlet port 290 it now flows through port 286, passageway 292 into chamber 142, between inner and intermediate tubes 132 and 130 to the forward side of the servo-motor piston. Movement of the blades as above described will be repeated except that the structure making possible the movement of the blades will act in opposite directions. The oil displaced by the new movement of the servo-motor piston will flow through passageway 370 and inner tube 132, chamber 152, passageway 294, ports 290, and return outlet 274 to the source of hydraulic supply. Movement of the forked arm 160 will therefore be in the opposite direction from that above described because of the reverse movement of the servo-motor piston and connecting rod 196 will act through ball 204, lever 208, ball rod 216 and valve stem 268 to return pistons to their original position of covering the ports in the control valve structure.

It should be understood that the foregoing disclosure relates to only the preferred embodiment of the invention and that numerous modifications or alterations may be made therein without departing from the spirit and the scope of the invention as set forth in the appended claims.

What is claimed is:

1. In combination, a controllable pitch propeller having blades and a hub, means for changing the pitch of said blades, said means comprising a pair of guide arms in said hub, a plurality of cable drums in said hub for respectively housing each of said blades, means connecting said guide arms to each of said cable drums, a servo-motor, a propeller shaft connecting said servo-motor with said hub, a piston in said servo-motor, means connecting said guide arms in said hub with the after end of said piston, an oil injector and control valve unit, said unit comprising a housing having a lever therein, a shaft pivotally mounting said lever in said housing, conduit means connecting said housing and lever with the forward end of said servo-motor piston for respectively providing an avenue for supply of fluid to said servomotor piston and for transmitting movement of said piston to said lever, a fluid control valve in said housing, means connecting said lever with said valve, a source of fluid supply for said housing, and means for moving said control valve thus providing an avenue for fluid flow from said source through said valve and conduit means to said servo-motor for imparting a force in said piston for changing the pitch of said blades.

2. In combination, a controllable pitch propeller having blades and a hub, means for changing the pitch of said blades, said means comprising a pair of guide arms in said hub, a plurality of cable drums in said hub for respectively housing each of said blades, means connecting said guide arms to said cable drums, a servo-motor, a piston in said servo-motor, hollow propeller shaft means connected at its forward end to said servo-motor and at its after end to said hub, a hollow push-pull rod positioned in said propeller shaft connecting said guide arms with said piston, an oil injector and control valve unit for supplying fluid power to either side of said piston, said unit comprising a housing having a first and second chamber, a source of fluid supply for said chambers, a hollow line shaft interconnecting said housing with said servo-motor, a fluid control valve having an opening into each of said chambers, a pair of concentric conduits positioned in said line shaft and respectively terminating at one end in said first and second chambers and at their other ends in said servo-motor, and means for operating said fluid control valve whereby fluid is permitted to flow through one of said chambers to said servo-motor and returning through the other chamber to said control valve.

3. In combination, a controllable pitch propeller having blades and a hub, means for changing the pitch of said blades, said means comprising a pair of guide arms in said hub, a cable drum in said hub for housing each of said blades, flexible means connecting said guide arms to said blades, power conversion and transmitting means connected at one end to said guide arms and at the other end to an oil injector and control valve unit, said unit comprising a housing having a fluid control valve and a pair of chambers, a source of fluid supply, a pair of concentric conduits respectively connected at one end to each of said chambers and at the other end to said transmitting means, and means controlling said fluid control valve whereby fluid is supplied and returned from said transmitting means through said concentric conduits and chambers.

4. In combination, a controllable pitch propeller having blades and a hub, means for changing the pitch of said blades, said means comprising a pair of guide arms in said hub, a cable drum for housing each of said blades, means connecting said guide arms to said cable drums, a servo-motor, a piston in said servo-motor, a hollow propeller shaft connected at its forward end to said servo-motor and at its after end to said hub, a hollow push-pull rod positioned in said propeller shaft connecting said guide arms with said piston, an oil injector and control valve unit, a source of fluid supply for said unit, a line shaft connecting said control unit with said servo-motor, control means in said unit for selectively supplying said fluid through said shaft to either side of said piston, a hollow tube in said line shaft forming a fluid passage between the inner walls of said shaft and said tube, means for supplying fluid to said hub, said fluid supplying means comprising an inlet in said control unit connecting with said fluid passage, a by-pass conduit attached to said servo-motor and connected at one end to said fluid passage and at its other end to said propeller shaft so that fluid flowing through said passage by-passes said servo-motor and re-enters the shaft prior to delivery to said hub.

5. In combination, a controllable pitch propeller having blades and a hub, a servo-motor, a rotatable shaft interconnecting said servo-motor and said hub, said servo-motor comprising a hollow housing forming a cylinder therein, a coupling sleeve rigidly secured to said housing and said shaft so that said servo-motor revolves with said shaft, a piston in said cylinder, a hollow push-pull rod having a plurality of holes in one end positioned in said shaft, means indirectly connecting said rod at one end to said propeller blades and at the other end to the after central portion of said piston, packing means sealing said cylinder from the area defined by the push-pull rod and the inner walls of said shaft, a bypass around said servo-motor, said bypass comprising a pipe connected at one end to said propeller shaft and adapted for connection at its other end to a source of fluid supply so that fluid supplied to said bypass flows through said hollow push-pull rod into said hub for maintaining the latter at a predetermined pressure, a plurality of openings extending through said piston adjacent said central portion of said piston, a hollow tube connector fitted over said openings and secured to said piston at one end and adapted to be connected at its other end to a fluid supply tube, and means operative for locking said piston in either a forward or after position in said cylinder.

6. In combination, a servo-motor assembly comprising a hollow housing forming a cylinder therein, a coupling sleeve rigidly secured to said housing and adapted to be connected to a propeller shaft extending thereinto, a centrally apertured plate secured to the forward end of said housing for receiving the after end of a line shaft, a piston in said cylinder, a tube connector, means fitting said tube connector over openings in said piston and sealing same in fluid-tight relationship with said piston, connecting means for securing the forward end of a rod to said connector, a bored opening in the side of said cylinder, a plug for said opening, said plug comprising a center hub portion having a projection extending therefrom in one direction and a longer projection extending in the opposite direction, a pair of holes cut to the same diameter of said plug in the forward and after peripheral portion of said piston for receiving the longer projection of said plug thereby locking said piston in a forward or aft position, and means coacting with said housing for detachably holding said plug in said opening, whereby said piston is free for movement or maintained in a locked position according to whether said projection or said longer projection extends through said bored opening in said cylinder.

References Cited in the file of this patent

UNITED STATES PATENTS

| | | |
|---|---|---|
| 2,181,562 | De Ganahl et al. | Nov. 28, 1939 |
| 2,363,823 | Wislicenus | Nov. 28, 1944 |
| 2,456,361 | Atteslander | Dec. 14, 1948 |
| 2,501,617 | Roesch | Mar. 21, 1950 |
| 2,513,546 | Atteslander | July 4, 1950 |
| 2,609,793 | Rose | Sept. 9, 1952 |

FOREIGN PATENTS

| | | |
|---|---|---|
| 230,833 | Switzerland | Jan. 31, 1944 |
| 446,679 | Italy | Mar. 23, 1949 |
| 603,115 | Great Britain | June 9, 1948 |